United States Patent [19]
Calhoun, III et al.

[11] Patent Number: 5,788,069
[45] Date of Patent: Aug. 4, 1998

[54] CD HOLDER WITH SPRING

[75] Inventors: Leroy E. Calhoun, III, Pinopolis, S.C.; William R. Rigby, Newark, Del.

[73] Assignee: Westvaco Corporation, New York, N.Y.

[21] Appl. No.: 880,295

[22] Filed: Jun. 24, 1997

Related U.S. Application Data

[60] Provisional application No. 60/020,073 Jun. 27, 1996.

[51] Int. Cl.$^6$ .................................................. B65D 85/57
[52] U.S. Cl. ................................... 206/312; 206/308.1
[58] Field of Search ............................. 206/308.1, 310, 206/311, 312, 472

[56] References Cited

U.S. PATENT DOCUMENTS

| | | | |
|---|---|---|---|
| 4,709,812 | 12/1987 | Kosterka | 206/310 |
| 4,771,890 | 9/1988 | Hofland et al. | 206/309 |
| 4,874,085 | 10/1989 | Grobecker et al. | 206/309 |
| 5,188,229 | 2/1993 | Bernstein | 206/312 |
| 5,205,405 | 4/1993 | O'Brien et al. | 206/310 |
| 5,248,032 | 9/1993 | Sheu et al. | 206/312 |
| 5,419,433 | 5/1995 | Harrer et al. | 206/313 |
| 5,421,453 | 6/1995 | Harrer et al. | 206/312 |
| 5,422,875 | 6/1995 | Bribach | 206/311 |
| 5,462,159 | 10/1995 | Roth et al. | 206/310 |
| 5,518,488 | 5/1996 | Schluger | 493/82 |
| 5,628,399 | 5/1997 | Engen | 206/308.1 |
| 5,630,504 | 5/1997 | Fitzsimmons et al. | 206/308 |
| 5,697,496 | 12/1997 | Bauer | 206/308.3 |
| 5,704,474 | 1/1998 | Oland | 206/312 |
| 5,713,463 | 2/1998 | Lakoski et al. | 206/312 |

FOREIGN PATENT DOCUMENTS 9427892  12/1994  WIPO .................................. 206/308.1

*Primary Examiner*—David T. Fidei

[57] ABSTRACT

A CD holder is prepared from three separate components comprising, an outer folder component, an intermediate panel, and an inner storage compartment. The storage compartment is die cut to provide a substantially circular opening having at least two spaced contact points and an integral spring element spaced around the periphery of the opening. CD's of varying diameter are captured by and retained in the storage compartment through the complementary action of the two or more contact points and the spring element.

2 Claims, 4 Drawing Sheets

5,788,069

CD HOLDER WITH SPRING

This application is derived from provisional application No. 60/020,073, filed Jun. 27, 1996.

BACKGROUND OF INVENTION

The present invention relates generally to a media storage disk package that is particularly suited for, but not limited to, the shipping and storage of compact audio discs, CD ROM's and other laser readable discs.

Traditionally, "jewel boxes" have been used as containers for compact discs and the like. As shown in U.S. Pat. No. 4,874,085, the standard jewel box comprises a clear plastic base and lid panel which are hingedly connected along one side. Printed promotional material is inserted inside the lid and base panel so that it is visible to the consumer. The assembled jewel box is then wrapped in plastic film.

Disadvantages of the traditional jewel box include limited recyclability, limited sharpness and clarity of the graphics printed on the inserts, and the fragile nature of the jewel box itself, which is easily broken. Some of these disadvantages have been overcome with the development of paperboard based packages, as shown, for example in U.S. Pat. Nos. 4,709,812; 5,188,229; 5,205,405; 5,248,032; 5,419,433; 5,421,453; 5,462,159; 5,518,488; and 5,630,504. Nevertheless, each of these modified designs still suffer from the same or related disadvantages, including complicated assembly, and awkward loading. In this connection, the development of the all paperboard CD holder of the '488 patent, which relies on a friction fit for the CD's, solved most of the aforementioned problems, but the patented design has proven to be impractical because of the fixed diameter of the circular opening for accommodating the discs.

Since the diameters of audio CD's are inconsistent, ranging in size from about 4.709 to 4.730 inches (11.96–12.01 cm), it is not possible to achieve a uniform friction fit with a single fixed diameter circular opening. If the opening is sized to accommodate the smallest diameter disc, larger discs will not fit. Conversely, if the opening is sized to accommodate the largest diameter disc, smaller discs simply fall out and are not retained in the CD holder. Accordingly, to overcome the disadvantages and problems with the prior art packages, and particularly with the design of the '488 patent, the present invention was developed.

SUMMARY OF INVENTION

The present invention provides a media disk storage container which avoids most if not all of the deficiencies of the prior art. The package of the present invention is prepared primarily from lightweight, economical and completely recyclable paperboard, and is thus more environmentally friendly than other prior art packages. The package of the present invention also has the advantage that it can be top loaded in a conventional manner unlike other combination plastic and paperboard packages shown in the aforementioned prior art. And finally, the package of the present invention provides an exterior surface which readily accepts high quality graphic images, while still being capable of use with disks which vary in size.

Toward this end, the CD holder of the present invention is preferably prepared from three separate paperboard components comprising an outer, book-like, folder component, an intermediate panel, and an inner storage component having a substantially circular opening which includes a unique spring element and at least two product retaining fixed contact points which together accept and retain CD discs of varying diameter within the inner storage component. More particularly, the outer folder component is preferably prepared from a single blank of paperboard having at least two adjacent panels separated from one another by a pair of spaced apart fold lines. The adjacent panels provide the outer book-like covers for the holder while the area between the spaced apart fold lines provides the spine portion of the holder. In the example more fully described herein, each of the book-like cover panels are preferably prepared from two thicknesses of paperboard which are joined together along a fold line. The blank material is preferably prepared from coated-one-side (C1S) paperboard that when folded, yields printability surfaces both inside and outside of the folder component. Such a construction requires a paperboard blank having in addition to the adjacent panels, additional separate panels foldably attached along corresponding edges of the adjacent panels.

Meanwhile, in a first embodiment of the invention, the storage compartment component for the compact disc is prepared by assembling multiple layers of paperboard of substantially the same size and shape as one of the book-like cover panels of the folder component, and laminating them together. This laminated stack is then die cut to provide the opening for accommodating a CD. For this purpose, the die is designed to produce an opening having at least three separate sectors each having a different radius. That is, at least one part of the opening comprises a sector having a radius that may for example be about one-half the diameter of the smallest disc expected to be encountered, while another part of the opening comprises a sector having a radius that may, for example, be about one-half the radius of the largest disc expected to be encountered. Meanwhile, located within the sector of the opening having the greatest radius is another sector having a different radius, measured from a different point. The third sector provides space within the opening to locate the unique spring element of the present invention.

The spring element of the present invention is prepared at the same time as the finger opening is prepared which is required to remove CD's from the CD compartment. For this purpose, the laminated stack of paperboard which has been previously die cut to produce the CD opening described above is laminated to an intermediate panel of paperboard. This combination is then die cut a second time to produce the aforementioned spring and finger opening. The intermediate panel is then trimmed to size (if necessary), and the combined laminated stack and intermediate panel are adhesively bonded to the previously prepared book-like folder at selected locations, being careful not to adhere any part of the spring device to the folder component. These steps are exemplary only, but together produce a CD holder prepared completely of paperboard that is useful for effectively retaining compact discs of varying diameter. This result is achieved by strategically locating the unique spring element of the present invention and the two fixed contact points on the disc opening so that they cooperate with one another. Theoretically, any circular object can be captured with three points as long as the three points are placed so that no two of them are equal to or greater than 180 degrees apart, and this concept is utilized in the present invention.

In another embodiment of the present invention the CD compartment may be formed as a stamping from a plastic substrate. The use of a stamped, plastic CD compartment component eliminates the need for an intermediate panel, as required for the all paperboard construction, but also limits the recyclability of the final product.

Accordingly, it is an object of the present invention to provide a CD holder which mimics the design of the traditional "jewel box" normally used to package CD's which may be constructed completely of paperboard.

Another object of the present invention is to provide such a CD holder which, in one of its embodiments is 100% recyclable, inexpensive, lightweight, mailable and completely printable on all exposed surfaces.

A further object is to provide a CD holder that has a unique design capable of accommodating CD's of varying size.

DETAILED DESCRIPTION

Figure 1:
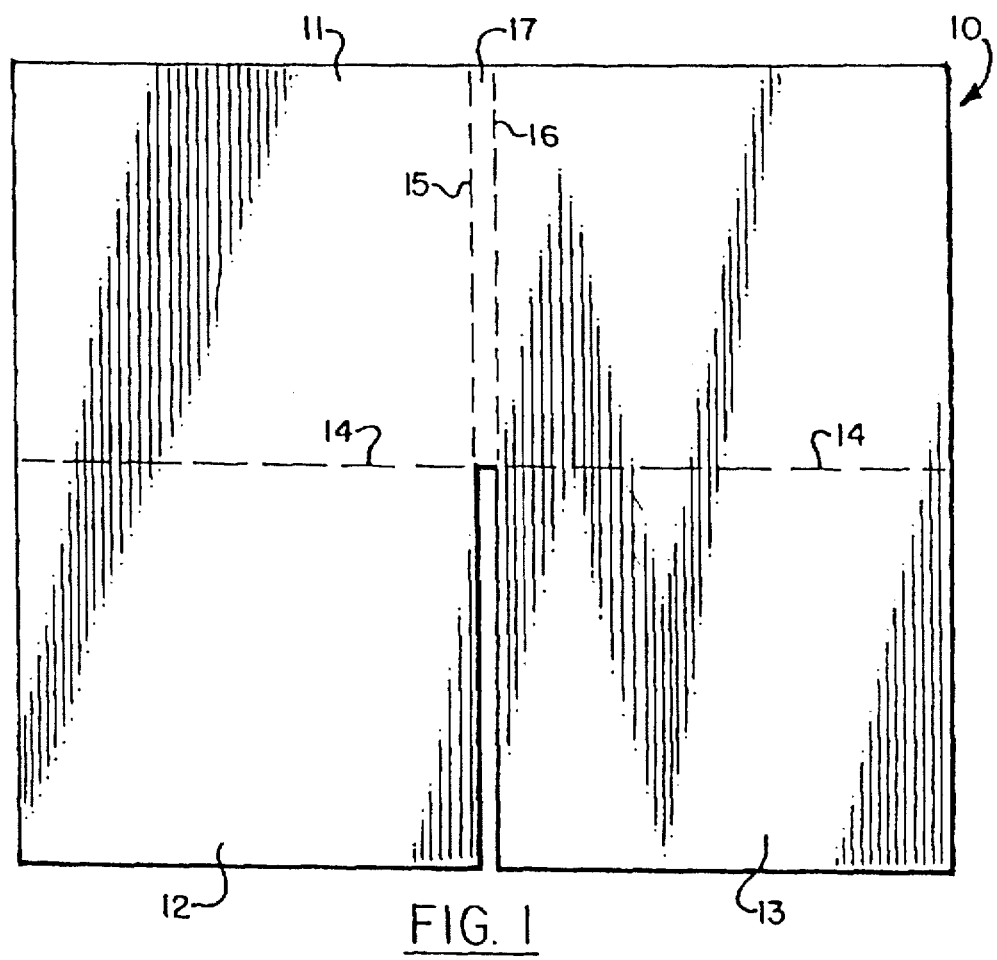
FIG. 1 is a plan view of a typical paperboard blank for the folder component of the CD holder of the present invention.
Figure 2:
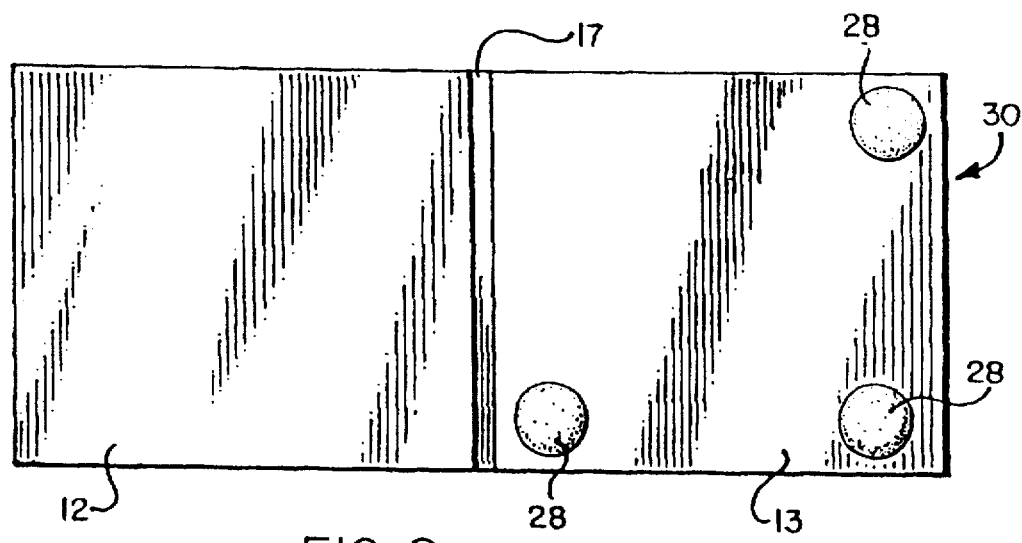
FIG. 2 is a plan view of the blank of FIG. 1, folded to produce the book-like cover panels of the folder component.

Referring now to the drawings, FIG. 1 illustrates a unitary paperboard blank 10 which may be used to construct the outer book-like folder component of the present invention. The blank comprises a first panel 11 having joined thereto separate fold over panels 12 and 13 along a fold line 14. The panels 12, 13 are spaced from one another by an amount equal to the spaced fold lines 15, 16 in panel 11. For this exemplary configuration, the blank 10 is preferably made from coated one side (C1S) paperboard, with the coated side down. Thus, when panels 12 and 13 are folded over about fold line 14, and adhered to the respective adjacent portions of panel 11 as shown in FIG. 2, all exterior surfaces will have the coated side out, suitable for printing with high quality graphics. In this configuration the combined panels 11, 12 and 11, 13 form the book-like covers of the folder component and the portion 17 of panel 11 between fold lines 15 and 16 forms the spine of the book to achieve the desired exterior appearance which mimics the "jewel box" construction conventionally used for CD packages. However, it will be apparent to those skilled in the art that the folder component may include more or fewer panels than those disclosed, as long as the desired result is achieved.

Figure 3:
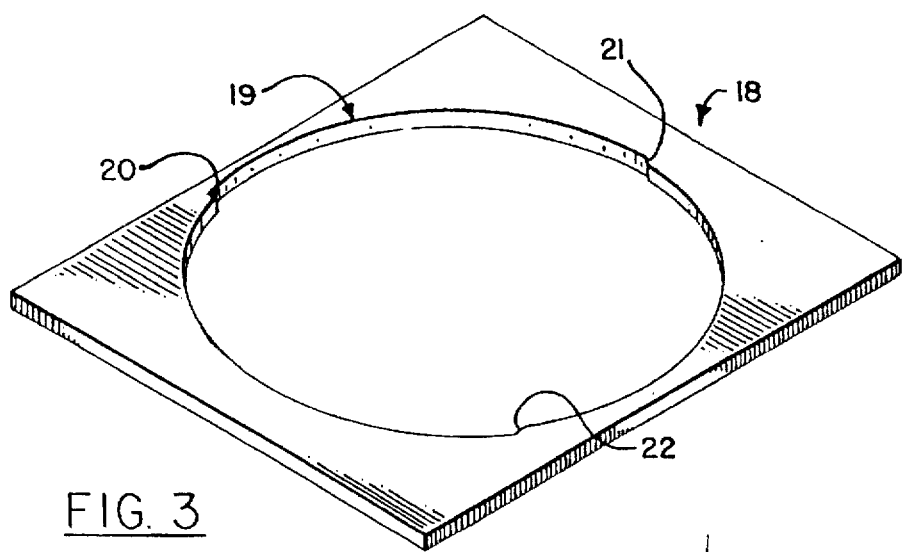
FIG. 3 is a perspective view of the laminated stack of paperboard layers used to construct the CD storage compartment component of the present invention after the first die cut.
Figure 4:
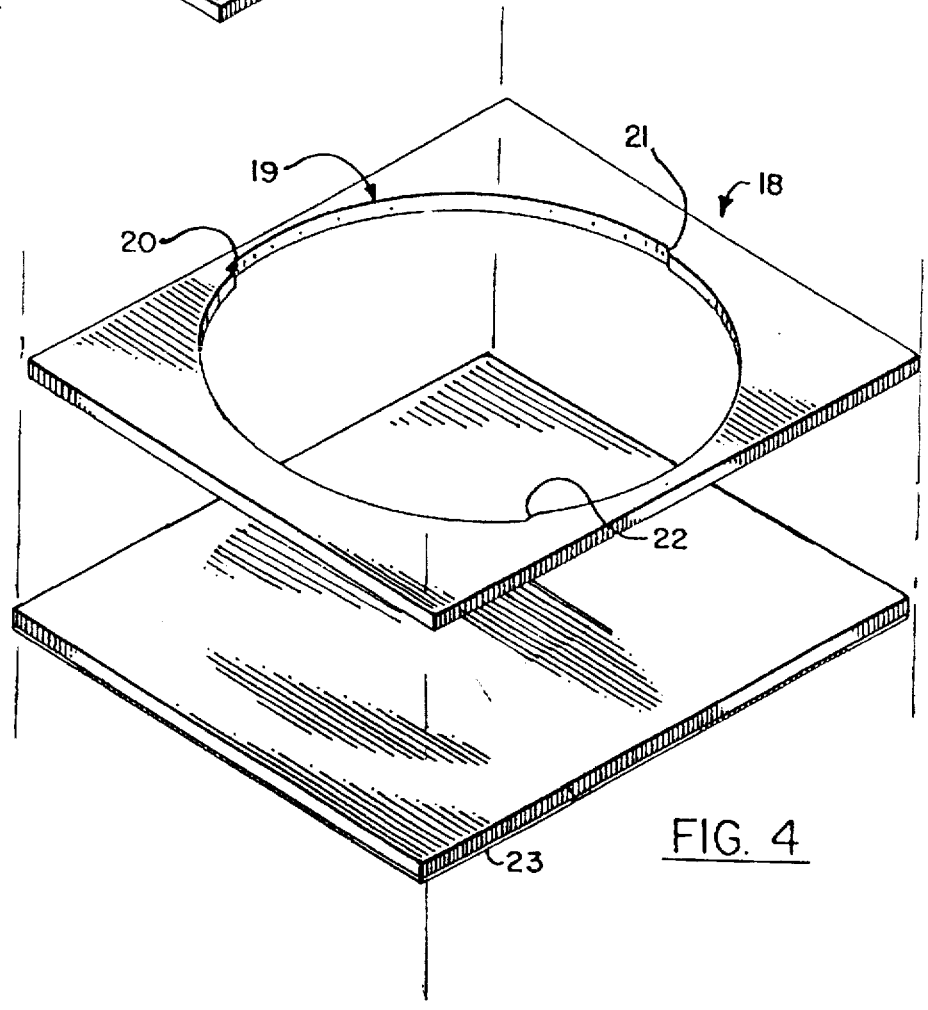
FIG. 4 is a perspective view showing a die cut, laminated stack of paperboard just prior to being adhered to an intermediate paperboard panel.
Figure 7:
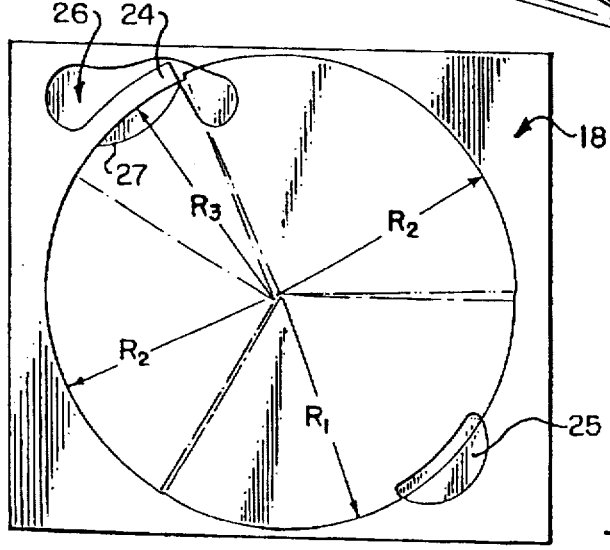
FIG. 7 is a plan view of the CD storage compartment component of FIG. 5 showing the different radii and centers which form the different sectors of the CD storage compartment opening; and, FIG. 8 is a perspective view of a completed CD holder according to the present invention.

FIG. 3 illustrates in perspective the first stage of construction of the preferred CD storage compartment component of the present invention after the first die cut. For this purpose, multiple layers of paperboard are first laminated together using commercially available methods. As an example, 4 sheets of 0.024 SBS (solid bleached sulfate) paperboard may be used. This laminated stack 18 is then die cut to provide a substantially round opening 19 as shown in FIGS. 3 and 4. The irregular shape of opening 19 is a significant feature of the present invention and departs substantially from the prior art, particularly as disclosed in the '488 patent, which utilizes a round opening of fixed diameter. The key features of opening 19 include a dog leg element 20 and two offsets 21, 22 spaced around the periphery of the opening, roughly equidistant from one another. These features are achieved, as shown more particularly in FIG. 7, with a die cut having at least three different radii $R_1$, $R_2$ and $R_3$ which emanate from different centers. As an example, $R_1$ is preferably about 2.358 inches and extends over a peripheral sector of about 120 degrees of opening 19. Meanwhile $R_2$ is preferably about 2.385 inches, and extends over the remaining peripheral sector of about 240 degrees of opening 19, except for an intermediate sector defined by the radius $R_3$ which is preferably about 2.37 inches measured from a different center, and which defines a peripheral sector of about 35 degrees of opening 19. In practice, $R_1$ may occupy a peripheral sector of between about 60–180 degrees, while $R_3$ may occupy a peripheral sector of between about 30–40 degrees, and the rest of the opening 19 has a peripheral sector defined by the radius $R_2$. The radii $R_1$, and $R_2$ are selected based upon the variance in the diameters of CD's expected to be encountered which have been found by experience to vary between about 4.709 to 4.730 inches (11.96 12.01 cm). Meanwhile the radius $R_3$ is preferably selected to lie within the radii selected for $R_1$ and $R_2$, but does not necessarily have to be so selected.

Figure 5:
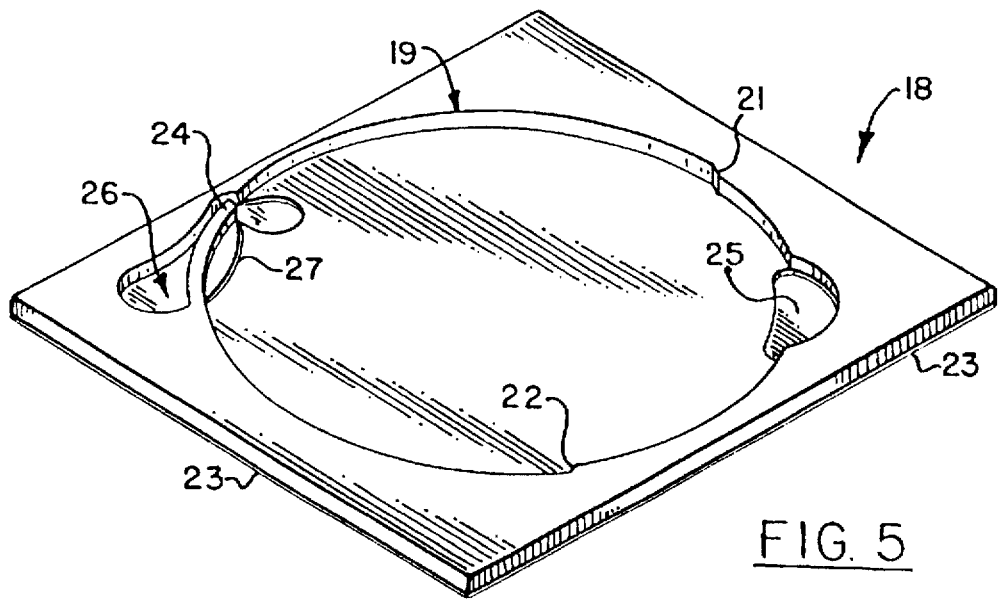
FIG. 5 is a perspective view of a combined laminated stack of paperboard and intermediate panel after the second die cut.
Figure 3A:
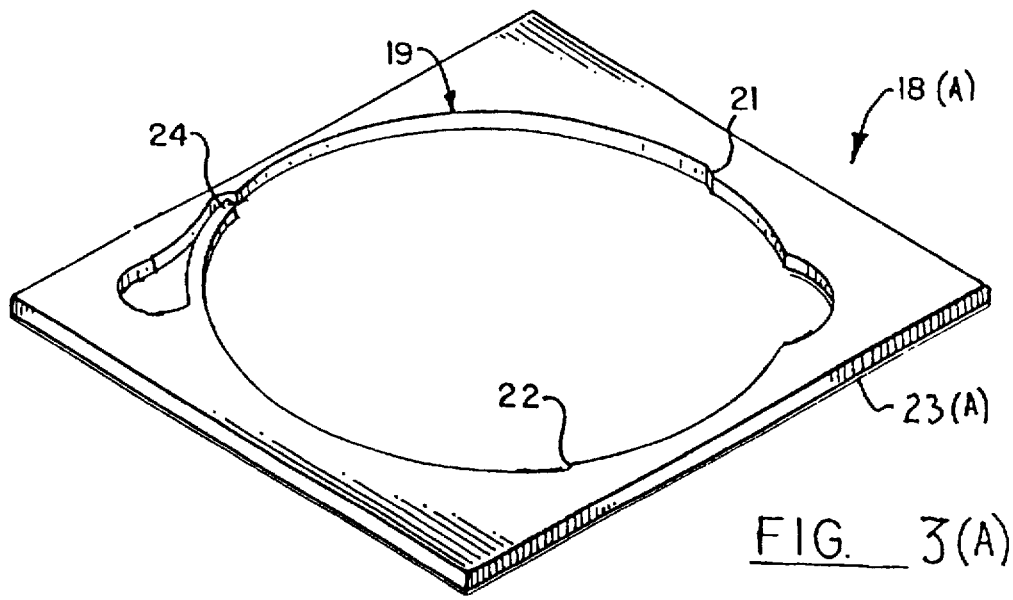
FIG. 3(A) is a perspective view showing a typical plastic stamping for forming the CD storage compartment.

After making the first die cut in laminated stack 18 shown in FIG. 3, the next step in the manufacturing process of the present invention involves the production of the novel spring element. For this purpose, the die cut laminate of FIG. 3 is adhered to an intermediate panel of paperboard 23 substantially as shown in FIG. 4. For this step, one or more sheets 23 of paperboard may be used. Once laminated, the combined elements 18 and 23 are die cut a second time to produce the spring element 24, finger opening 25 and spring flex area 26, all as shown in FIG. 5. The second die cut requires cutting completely through the laminated stack 18 and the sheet(s) 23 to produce the finger opening 25 and flex area 26, while cutting only through the sheet(s) 23 along line 27 to allow the attached spring element 24 to be flexed with respect to the rest of the structure. The cut at line 27 provides some independence for the spring element 24 to allow it to flex with the attached part of panel 23 so that the spring will always be in contact with a CD inserted in the CD storage compartment notwithstanding the diameter of the CD.

Figure 6:
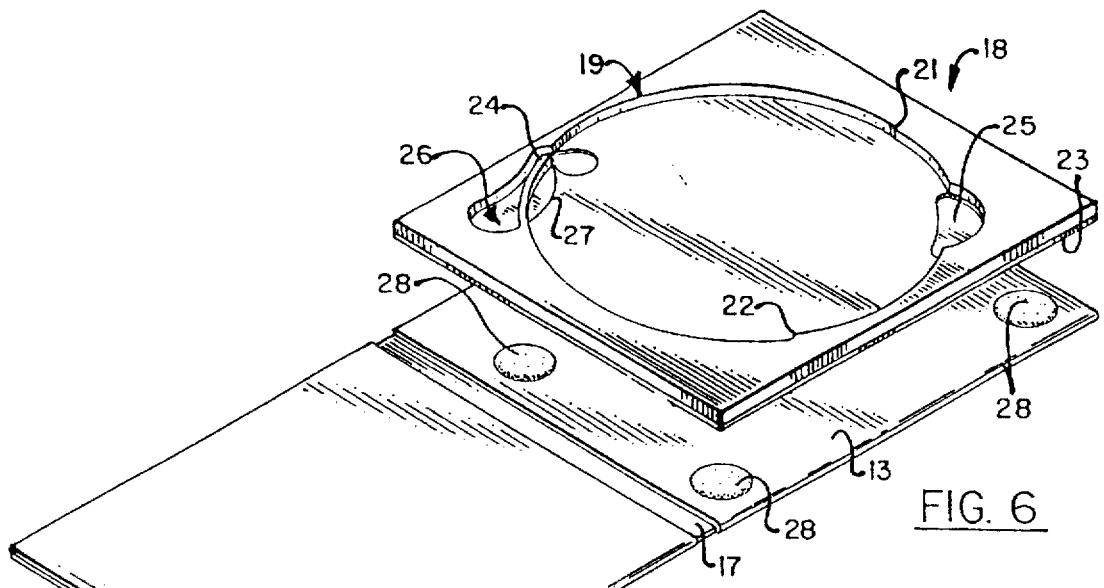
FIG. 6 is a perspective view of the CD storage compartment component of FIG. 5 just prior to being bonded to the outer folder component.
Figure 8:
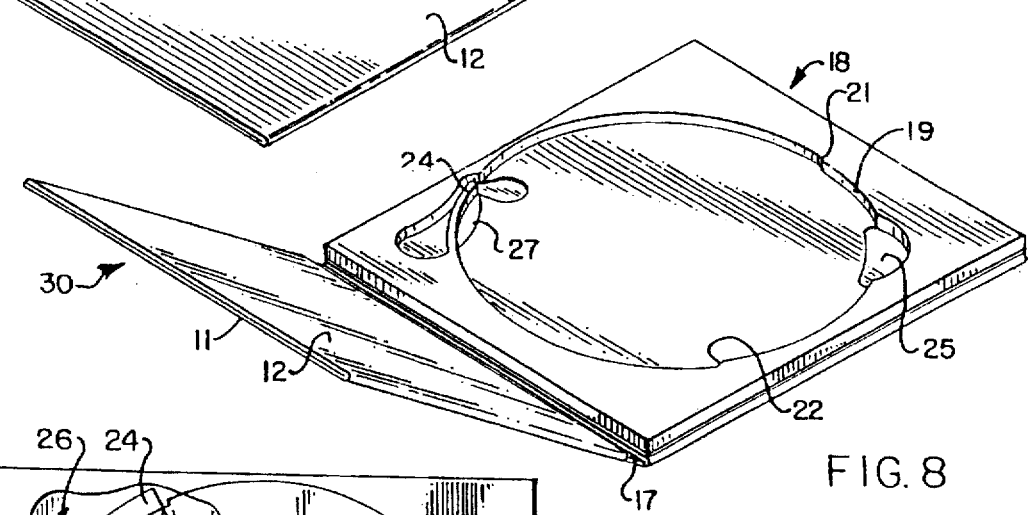

The combined laminated stack 18 and intermediate panel 23 prepared as shown in FIG. 5 are then bonded to the outer folder component 30 as shown in FIG. 6 with an adhesive application, as for example, with adhesive dots 28 shown in FIGS. 2 and 6. This step in the process must be done so as not to bond the area of panel 23 defined by cut line 27 to the folder panel 13 so as to leave the spring element 24 freedom to flex as necessary. The final product is shown in FIG. 8, for example, with the understanding that the different forms of packaging other than a folder 30, known to those skilled in the art, may be used. In the embodiment of the invention where the CD compartment is formed from a plastic stamping, the stamping can be adhered directly to the inside of the book cover thereby eliminating the need for an intermediate panel 23.

The CD holder is designed to accept and retain CD's of varying size. For example, the spring feature is designed so that in its original position, the opening 19 between the spring element 24 and the finger opening 25 of FIG. 8 is slightly smaller than the smallest disc likely to be encountered. Thus, because the spring element 24 is free to flex as described hereinbefore, there will always be some compressive force applied against even the smallest disc when it is inserted in the storage compartment. Typically, discs are loaded in the storage compartment by first placing one edge of the disc in contact with the spring 24. As the CD is pushed against the resistance offered by the spring 24, the opposite edges of even the smallest sized disc will readily fit between the two offset points 21, 22 since the radius of the opening 19 within the sector between points 21 and 22 is preferably equal to about one-half the diameter of the smallest sized disc likely to be encountered. As the disc sizes increase, there will be a need to push even harder against the spring element 24 to urge an edge of the disc even closer to the edge of the opening 19 within the two sectors which have radii substantially equal to about one-half the diameter of the largest disc likely to be encountered. As this occurs, each disc size will still be captured between the offsets 21, 22, but a gap will appear between the edge of the disc and the sector of opening 19 between offsets 21, 22. In each instance, however, there will always be at least three spaced contact points around the periphery of the storage compartment consisting of the points 21, 22 and the spring 24, for capturing and retaining the CD. By providing a construction where each individual disc, despite its varying diameter, can come in contact with different sectors of the opening 19, a consistent and reliable grip may be maintained throughout the range of sizes. In addition, the design disclosed herein eliminates the need for a center hub element which is common in most CD holders.

Thus while the description of the product and method of making the product set forth hereinbefore is fully capable of attaining the objects and providing the advantages desired, it is to be understood that this description is merely illustrative of a preferred embodiment of the invention and the true scope thereof is only to be limited by the metes and bounds set forth in the appended claims.

What is claimed is:

1. A compact disc holder for accommodating compact discs of varying size comprising, an outer cover and an inner compact disc storage compartment, said inner compartment being formed from a stack of paperboard panels superposed and laminated together which are in turn bonded to a separate paperboard panel, said panels having a generally circular opening cut therefrom for accommodating a compact disc, said opening comprising at least three peripheral sectors each having a different radius to provide at least two spaced apart contact points, said combined panels and separate paperboard panel having a spring element cut therefrom, and located generally opposite the two spaced apart contact points wherein the two spaced apart contact points and the spring act together to retain compact discs of varying size within the compact disc storage compartment.

2. A compact disc holder for accommodating compact discs of varying size comprising, an outer cover and an inner compact disc storage compartment, said inner compartment being prepared from a plastic component having a generally circular opening cut therein for accommodating a compact disc, said opening having at least three peripheral sectors each having a different radius to provide at least two spaced apart contact points and an integral spring element located generally opposite the two contact points wherein the two contact points and the spring element act together to retain compact discs of varying size within the compact disc storage compartment.

* * * * *